(12) United States Patent
Carter et al.

(10) Patent No.: US 8,914,363 B2
(45) Date of Patent: Dec. 16, 2014

(54) DISAMBIGUATING TAGS IN NETWORK BASED MULTIPLE USER TAGGING SYSTEMS

(75) Inventors: Bernadette A. Carter, Cary, NC (US); Belinda Y. Chang, Cary, NC (US); FuYi Li, Sudbury, MA (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1600 days.

(21) Appl. No.: 12/125,485

(22) Filed: May 22, 2008

(65) Prior Publication Data

US 2009/0292686 A1  Nov. 26, 2009

(51) Int. Cl.
*G06F 7/00* (2006.01)
*G06F 17/30* (2006.01)

(52) U.S. Cl.
CPC .... *G06F 17/30873* (2013.01); *G06F 17/30731* (2013.01)
USPC ........................................................ 707/736

(58) Field of Classification Search
None
See application file for complete search history.

(56) References Cited

U.S. PATENT DOCUMENTS 5,007,019 A * 4/1991 Squillante et al. ............ 715/206
2008/0263038 A1* 10/2008 Judge et al. ........................ 707/6

OTHER PUBLICATIONS

Vander Wal, Thomas, Folksonomy Coinage and Definition, Feb. 2, 2007, www.vanderwal.net, http://www.vanderwal.net/folksonomy.html.*
Unknown, Using a Dictionary, Unknown but verified as of 2004 through archive.org, http://library.thinkquest.org/5585/dictionary.htm.*
Marchetti, Andrea et al., "SemKey: A Semantic Collaborative Tagging System", http://www2007.org/workshops/paper_45.pdf,(May 8-12, 2007).
Vaplkel, Max et al., "Semantic Wikipedia", http://www2006.org/programme/files/xhtml/4039/xhtmlifp4039-voelkel.html,(May 23-26, 2006).
Guy, Marieke et al., "Folksonomies", http://www.dlib.org/dlib/january06/guy/01guy.html,(Jan. 2006).
Hamilton, James, "Semantic: Tagging", http://whoyouknow.co.uk/st/, (Dec. 19, 2006).

* cited by examiner

*Primary Examiner* — Jason Liao
(74) *Attorney, Agent, or Firm* — DeLizio Gilliam, PLLC

(57) ABSTRACT

Allowing users of a network based multiple user tagging system to use any phrase they feel is relevant to the resource can lead to ambiguities within the system. For example, a user may tag a picture of a gift with the keyword "bow". Another user may tag a picture of a bow and arrow with the keyword "bow". This may cause a problem for someone searching with the keyword "bow" when looking for information about making a bow for a gift. The user looking for gift bows does not want to see search results for bows and arrows. Functionality can be implemented in a folksonomy tagging system to disambiguate tags by associating them with definitions. Associating ambiguous tags with appropriate definitions will increase search accuracy for users of folksonomy tagging systems, thus allowing users to find relevant information more efficiently.

19 Claims, 7 Drawing Sheets

DISAMBIGUATING TAGS IN NETWORK BASED MULTIPLE USER TAGGING SYSTEMS

BACKGROUND

Embodiments of the inventive subject matter generally relate to the field of folksonomy tagging, and, more particularly, to disambiguating folksonomy tags.

Many social networking websites such as Flickr and del.icio.us support folksonomy tagging. Folksonomy tagging systems are collaborative classification systems that allow users to tag certain web resources with any term the user feels is relevant to the content. In this instance, tagging refers to assigning a keyword to a resource to allow browsing by the keywords.

SUMMARY

Embodiments include a method directed to determining that a tag to be associated with a resource is an ambiguous tag. At least a first of a plurality of definitions from one or more electronic dictionaries are determined as appropriate for the resource. The ambiguous tag is associated with the first definition.

BRIEF DESCRIPTION OF THE SEVERAL DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to folksonomy tagging systems, embodiments can be implemented in social tagging, social indexing, collaborative tagging and social classification systems. In other instances, well-known instruction instances, protocols, structures and techniques have not been shown in detail in order not to obfuscate the description.

Allowing users of a folksonomy tagging system to use any phrase they feel is relevant to the resource can lead to ambiguities within the system. For example, a user may tag a picture of a gift with the keyword "bow". Another user may tag a picture of a bow and arrow with the keyword "bow". This may cause a problem for someone searching with the keyword "bow" when looking for information about making a bow for a gift. The user looking for gift bows does not want to see search results for bows and arrows. Functionality can be implemented in a folksonomy tagging system to disambiguate tags by associating them with definitions. Associating ambiguous tags with appropriate definitions will increase search accuracy for users of folksonomy tagging systems, thus allowing users to find relevant information more efficiently.

Figure 1:
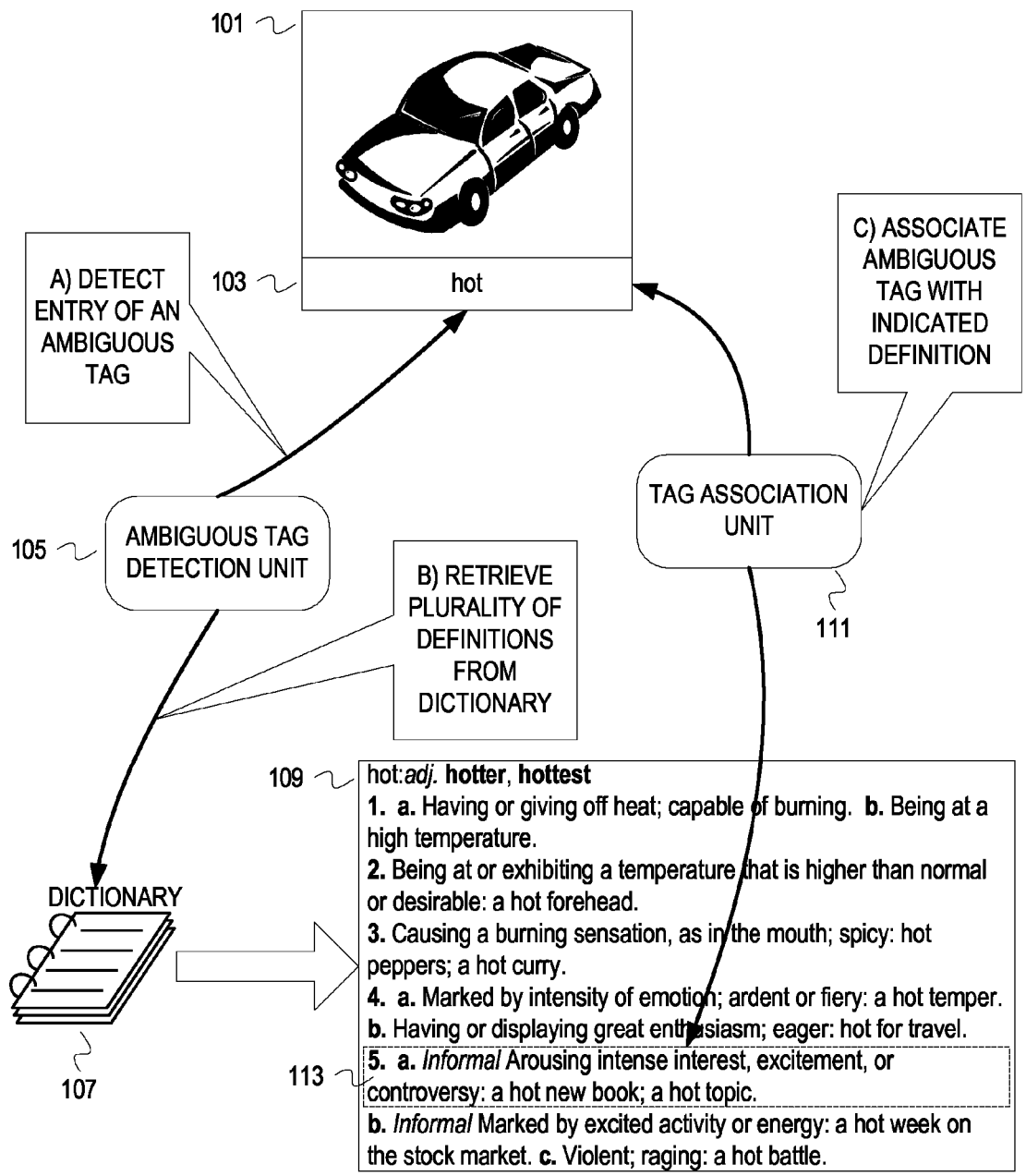
FIG. 1 depicts a conceptual example of disambiguating a tag in a folksonomy tagging system.

FIG. 1 depicts a conceptual example of disambiguating a tag in a folksonomy tagging system. At stage A, entry of an ambiguous tag 103, "hot", for a resource 101 is detected by an ambiguous tag detection unit 105. The resource 101 is an image of a car. Examples of resources include images, web pages, articles, etc. An ambiguous tag is a word or phrase that has more than one possible meaning.

At stage B, the ambiguous tag detection unit 105 retrieves a plurality of definitions 109 for the ambiguous tag 103 from a dictionary 107. The dictionary can be selected by an administrator of the folksonomy tagging system, selected by a user, dynamically selected based on popularity, etc. The dictionary can be hosted on the server of the folksonomy tagging system or referenced on an external server.

At stage C, a tag association unit 111 associates the ambiguous tag 103 with an indicated definition 113 from the plurality of definitions 109. The indicated definition 113 may be selected by a user in response to a prompt or may be determined by a folksonomy tagging system. The indicated definition 113 is "arousing intense interest, excitement, or controversy." Examples of associating the ambiguous tag with the definition include adding text of the indicated definition to metadata associated with the tag, adding a reference to the indicated definition to metadata associated with the tag, etc.

Figure 2:
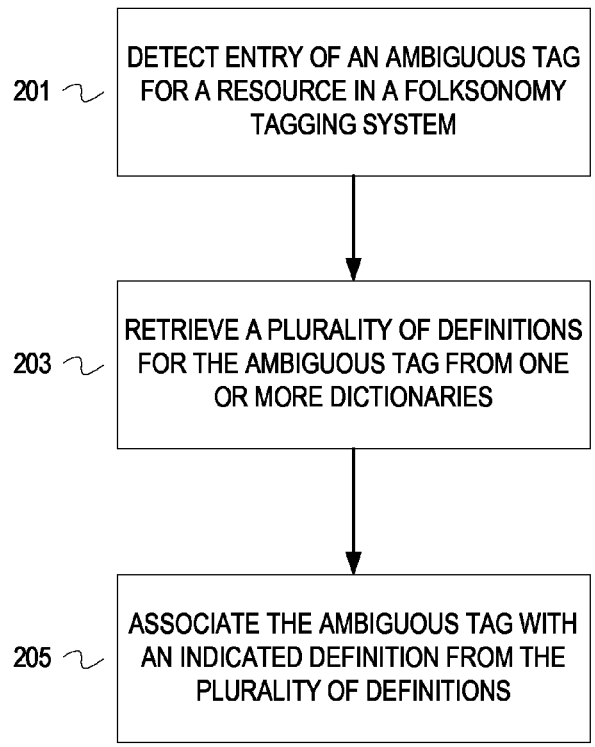
FIG. 2 is a flowchart depicting example operations for disambiguating a tag in a folksonomy tagging system.

FIG. 2 is a flowchart depicting example operations for disambiguating a tag in a folksonomy tagging system. Flow begins at block 201, where entry of an ambiguous tag for a resource in a folksonomy tagging system is detected. A tag is considered to be ambiguous when more than one definition for the tag exists. Examples of ambiguous tags are homonyms, heteronyms, slang terms, etc.

At block 203, a plurality of definitions for the ambiguous tag is retrieved from one or more dictionaries. There may be more than one dictionary associated with the folksonomy tagging system, for example, to support multiple languages. Configurations can be set with regard to default dictionaries. For example, a user's primary language is English, so the user sets their default dictionary to English. In addition, definitions for slang terms may be included in a main dictionary or in a separate dictionary.

At block 205, at least one of the plurality of definitions appropriate for the ambiguous tag is indicated. Embodiments can implement any one or more of a variety of techniques to determine whether a definition is appropriate. For instance, a system can present a user with the plurality of definitions and indicate the one or more definitions selected by the user. As another example, a system can indicate the most appropriate one or more of the plurality of definitions for the ambiguous tag based, at least in part, on analysis of the resource.

At block 207, the ambiguous tag is associated with the indicated definition from the plurality of definitions. In some embodiments, one definition can be associated with a tag. In other embodiments, more than one definition can be associated with a tag. Moreover, a system can prioritize definitions when multiple definitions are associated with an ambiguous tag. For example, the system may determine that three dissimilar definitions of the plurality of definitions are appropriate based on analysis of the resource. In this case, the system can use the analysis and/or other data (e.g., a heuristic) to prioritize the three definitions and associate all three of the definitions with the ambiguous tag. The three definitions can remain associated with the ambiguous tag, or the system can later re-evaluate the three definitions based, for example, on subsequently added tags. The system can modify the priorities and/or disassociate one or two of the three definitions from the ambiguous tag.

Figure 3:
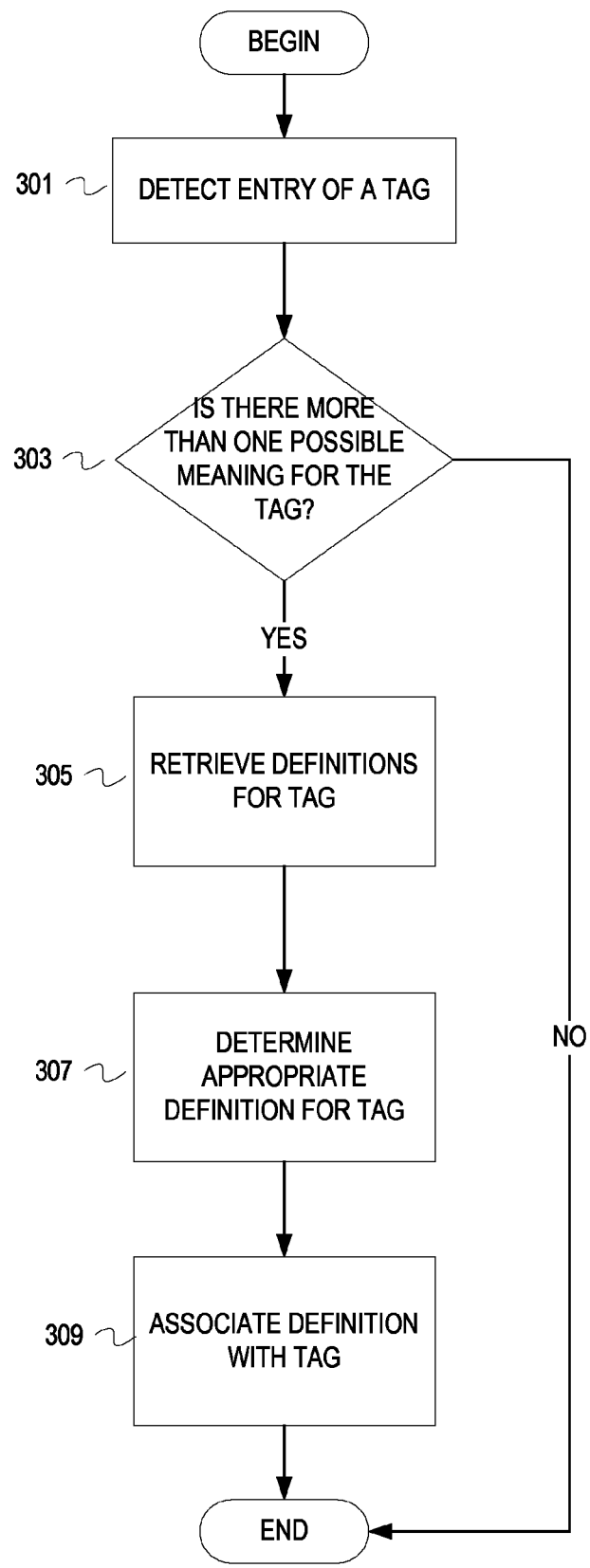
FIG. 3 is a flow chart depicting example operations for associating an ambiguous tag with a definition.

FIG. 3 is a flow chart depicting example operations for associating an ambiguous tag with a definition. Flow begins at block 301, where entry of a tag for a resource in a folksonomy tagging system is detected.

At block 303, it is determined if there is more than one possible meaning for the tag. An example of a tag with more than one possible meaning is "polish". The tag could mean "to make something shiny" or "from Poland". If there is more than one possible meaning for the tag, flow continues at block 305. If there is not more than one meaning, flow ends.

At block 305, possible definitions for the tag are retrieved. In some embodiments, the definitions may be retrieved from a cache of definitions recently retrieved from a database containing the dictionary. The cache may contain a list of all of the definitions for a tag found in the dictionary or a subset of the definitions found in the dictionary that have recently been chosen for the ambiguous tag. In other embodiments, definitions for the phrase are primarily retrieved from the database containing the dictionary.

At block 307, the appropriate definition for the tag is determined. The appropriate definition may be determined by the folksonomy tagging system or indicated manually by a user. The user may be presented with a subset of the definitions that have been recently chosen for the tag. If the subset does not contain a suitable definition for the ambiguous tag, the user can choose to retrieve more definitions. The folksonomy tagging system can also determine the definition by analyzing definitions previously indicated by the user, definitions previously submitted for the same resource or similar resources, tags previously submitted for the same resource or similar resources, text contained within the resource or similar resources, etc.

For example, a user enters the tag "hot" for a chili recipe. In this case, the appropriate definition for the tag is "causing a burning sensation, as in the mouth; spicy." The folksonomy tagging system analyzes previously submitted tags and discovers that another user entered "spicy" as a tag. The system chooses the above definition and prompts the user to confirm the definition.

In the previous example, the tag, "hot", may be the first tag entered for the chili recipe. The folksonomy tagging system can analyze text within the recipe to determine the appropriate definition. The example recipe text includes a sentence "Add another jalapeno to make the recipe more spicy." Since the word spicy exists in the text, the system chooses the definition "causing a burning sensation, as in the mouth; spicy." In some cases, there may not be text associated with a resource such as an image, for example. Embodiments can also consult heuristics to aid in determining an appropriate definition. When the folksonomy tagging system cannot determine an appropriate definition for a tag, the definition is indicated by a user.

At block 309, the definition is associated with the tag and flow ends. In some embodiments, the definition determined by the folksonomy tagging system is automatically associated with the tag. In other embodiments, the definition determined by the folksonomy tagging system is presented to the user as a suggestion. The user can decide if the definition is appropriate. If the definition is not appropriate, more definitions are displayed and the user can choose the appropriate definition.

Functionality for disambiguating tags in a folksonomy tagging system may be implemented after a plurality of tags have been entered for resources within the system. In some embodiments, previously existing tags are not updated with definitions. In other embodiments, the system may use techniques discussed above for automatically determining a definition for an entered tag to determine appropriate definitions for existing tags. If the system cannot automatically determine an appropriate definition for a tag, the tag may not be updated or may be removed from the system. Embodiments can also periodically send requests to the authors/originators of previously created resources to determine appropriate definitions.

A folksonomy tagging system that associates an appropriate definition with an ambiguous tag allows accurate categorization of content for browsing, and increased relevancy of search results. In addition, the mechanism for determining the meaning of an ambiguous tag can be extended to ambiguous search terms. Associating ambiguous tags with a definition increases the searching accuracy when a user can specify the meaning of the search term. Hence, relevancy can be increased using both an appropriate definition for a search term and appropriate definitions associated with tags of resources accessed for a search with the search term.

Figure 4:
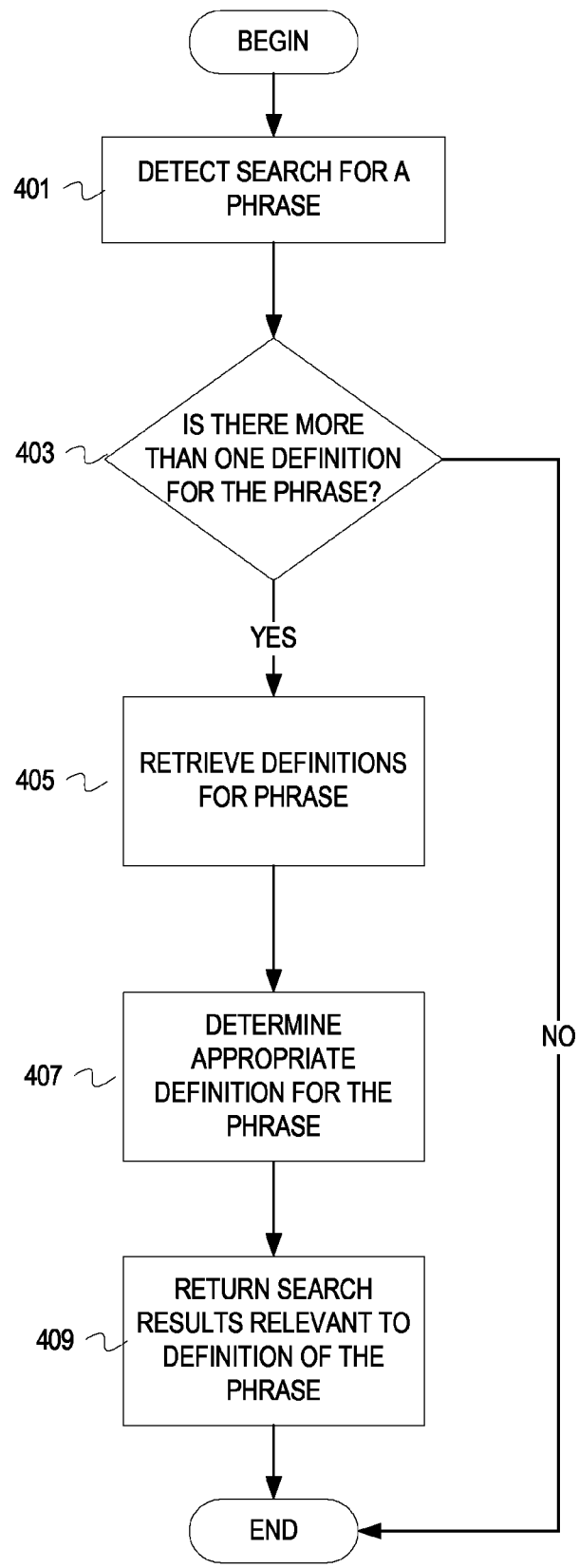
FIG. 4 is a flow chart depicting example operations for determining the meaning of a search term and returning relevant results.

FIG. 4 is a flow chart depicting example operations for determining the meaning of a search term and returning relevant results. Flow begins at block 401, where a search is detected. Examples of detecting a search include detecting clicking of a search button, detecting a typing of return when the cursor is in a search text box, receiving a search term from another executing code unit (e.g., a graphical user interface code unit), etc.

At block 403, it is determined if there is more than one possible meaning for a search term. The search term consists of a word or group of words. If there is more than one possible meaning for the search term, flow continues at block 405. If there is not more than one meaning, flow continues at block 411.

At block 405, possible definitions for the search term are retrieved. In some embodiments, the definitions may be retrieved from a cache of definitions recently retrieved from a database containing the dictionary. The cache may contain a list of all of the definitions for a search term found in the dictionary or a subset of the definitions found in the dictionary that have recently been chosen for the search term. In other embodiments, definitions for the search term are primarily retrieved from the database containing the dictionary. In addition, the definitions retrieved for tags and search terms may exist within the same cache.

At block 407, the appropriate definition for the search term is determined. The appropriate definition may be determined by the folksonomy tagging system or indicated manually by a user. The user may be presented with a subset of definitions that have been recently chosen for the search term. If the subset does not contain a suitable definition, the user can choose to retrieve more definitions. The folksonomy tagging system may determine the definition by analyzing definitions previously indicated by the user for searching or tagging, definitions previously chosen in recent searches by other users, etc. For example, a user enters a search term "hair band". Two possible definitions for the search term are "a device used to fasten hair into a hairstyle" or "rock band popular in the 1980s whose members are characterized by having long, teased hair". The folksonomy tagging system determines that the user has previously tagged an article about the rock band Motley Crue with "hair band". The system suggests the definition "rock band popular in the 1980s . . . ." In some embodiments, the definition determined by the folksonomy tagging system is automatically used for the search. In other embodiments, the definition determined by the folksonomy tagging system is presented to the user as a suggestion. The user can decide if the definition is appropriate. If the definition is not appropriate, more definitions are displayed and the user chooses the appropriate definition.

At block 409, search results relevant to the definition of the search term are returned. A plurality of possible search results is retrieved by matching the search term with words or phrases in resource tags and/or text. The plurality of possible search results is analyzed and a resource is included in the search results when the definition associated with one or more tags matches the definition of the search term.

If it was determined that there was not more than one definition for the search term at block 403, then search results are returned for the search term at block 411. In this case, a definition for the search term did not exist in the dictionary, the dictionary contained one definition for the search term, a definition could not be found, etc. Results are returned based on matching the search term with words in resource tags and/or text.

Figure 5:
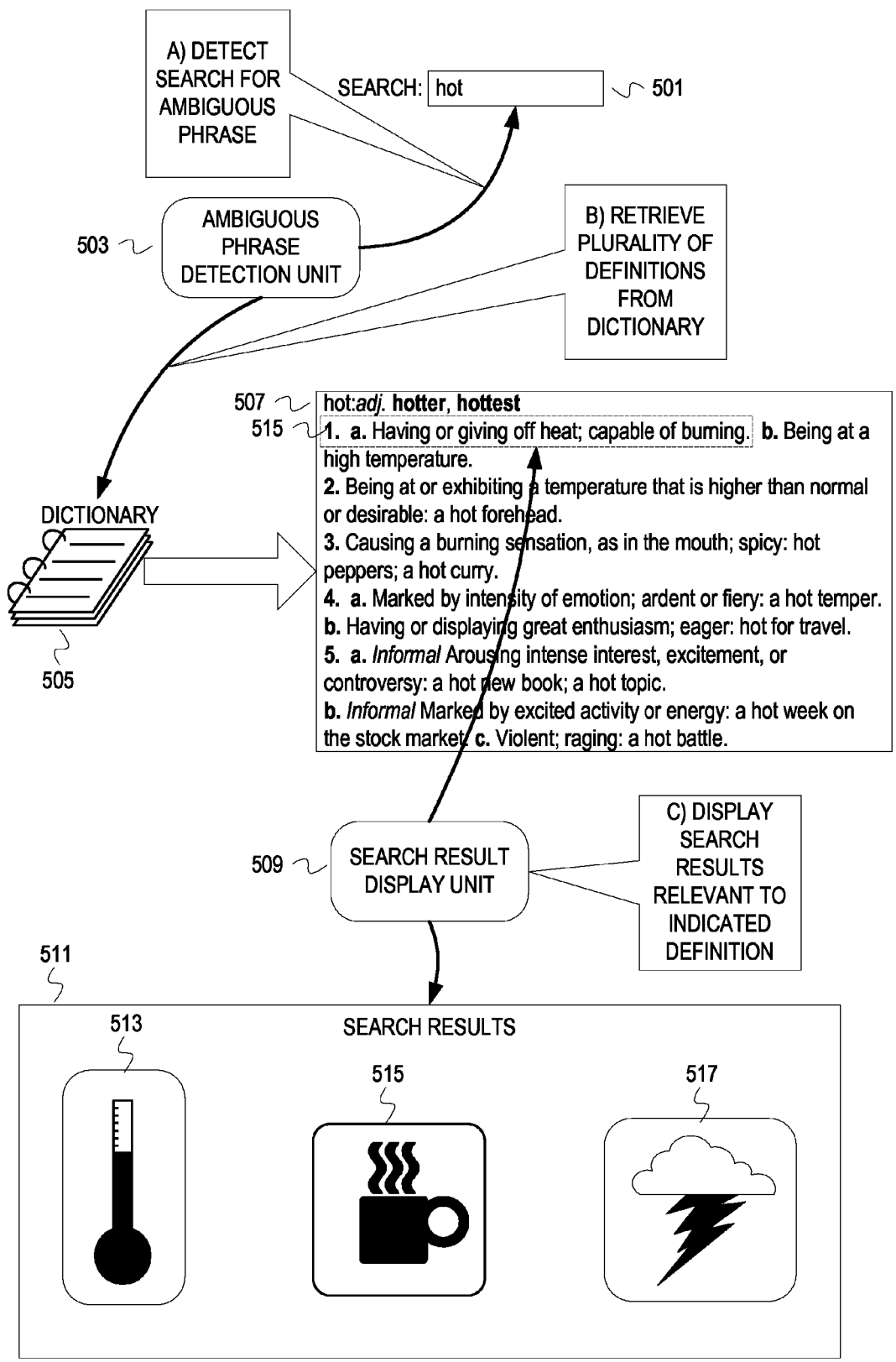
FIG. 5 depicts an example of disambiguating a search term.

FIG. 5 depicts an example of disambiguating a search term. At stage A, a search for an ambiguous term 501, "hot", is detected by an ambiguous term detection unit 503.

At stage B, the ambiguous term detection unit 503 retrieves a plurality of definitions 507 for the ambiguous term 501 from a dictionary 505.

At stage C, a search result display unit 509 displays search results 511 relevant to an indicated definition 515. The indicated definition 515 is "having or giving off heat, capable of burning." The indicated definition 515 may be selected by a user in response to a prompt or may be determined by a folksonomy tagging system. The search results 511 include images of a thermometer 513, a cup of coffee 515, and a bolt of lightning 517. Although not shown, search results may include items other than images, such as web pages, articles, text documents, etc.

Figure 6:
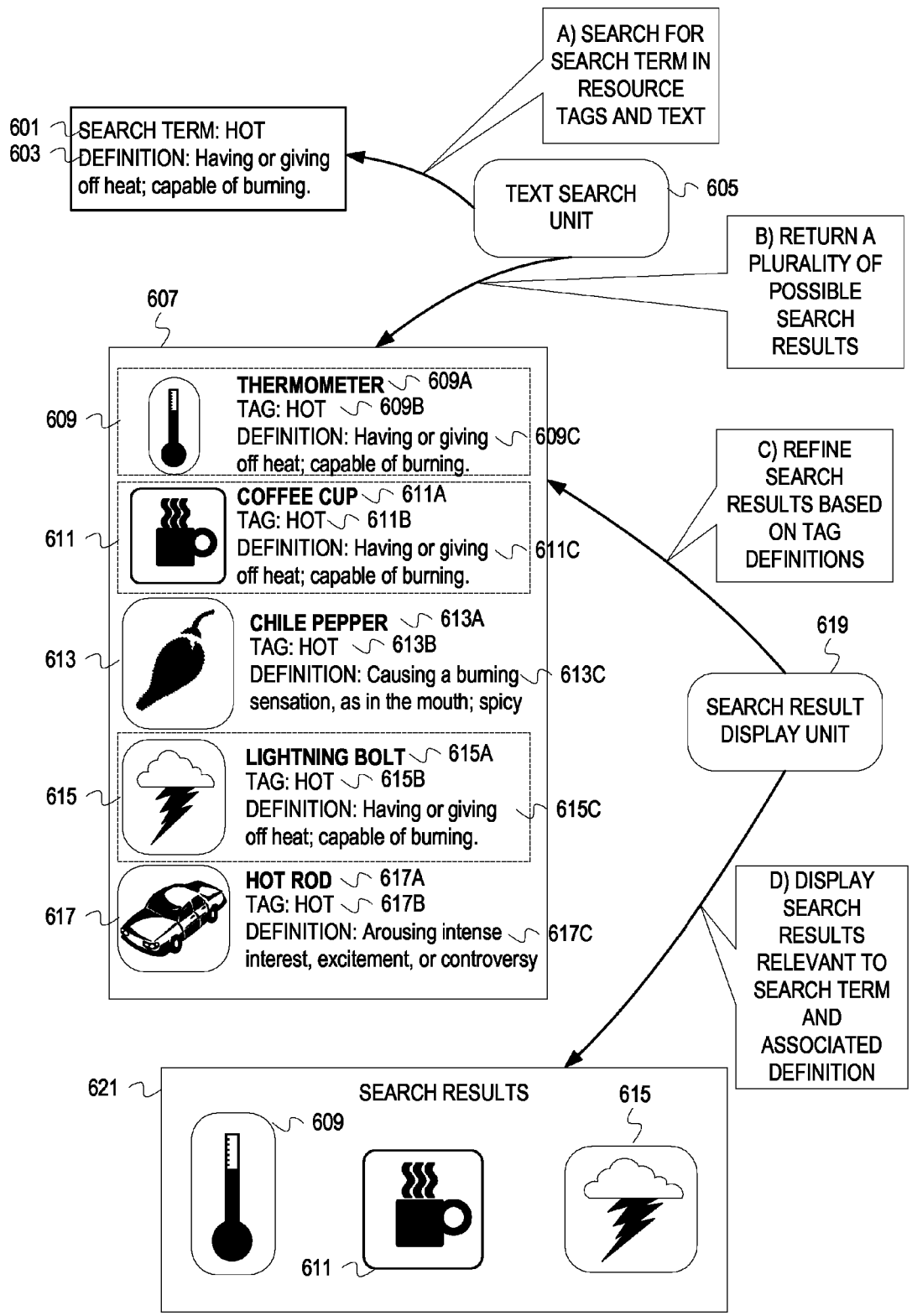
FIG. 6 depicts a conceptual diagram of an example of returning search results appropriate to a search term associated with a definition.

FIG. 6 depicts a conceptual diagram of an example of returning search results appropriate to a search term associated with a definition. At stage A, a text search unit 605 searches for a search term 601, "hot," in tags and/or text. The search term 601 has previously been associated with a definition 603 which is "having or giving off heat; capable of burning."

At stage B, the text search unit 605 returns a plurality of possible search results 607 that contain the search term in a tag associated with a resource and/or in the resource text. The plurality of possible search results 607 for search term 601, "hot", includes an image 609 of a thermometer, an image 611 of a coffee cup, an image 613 of a chile pepper, image 615 of a lightning bolt and image 617 of a car. A title 609A, "thermometer," and a tag 609B, "hot," are associated with image 609. A title 611A, "coffee cup", and a tag 611B, "hot," are associated with image 611. A title 613A, "chile pepper," and a tag 613B, "hot," are associated with image 613. A title 615A, "lightning bolt," and a tag 615B, "hot," are associated with image 615. A title 617A, "hot rod," and a tag 617B, "hot," are associated with image 617. A definition 609C, "Having or giving off heat; capable of burning," is associated with tag 609B. A definition 611C, "Having or giving off heat; capable of burning," is associated with tag 611B. A definition 613C, "Causing a burning sensation, as in the mouth; spicy," is associated with tag 613B. A definition 615C, "Having or giving off heat; capable of burning," is associated with tag 615B. A definition 617C, "Arousing intense interest, excitement, or controversy," is associated with tag 617B. In this case, the search term 601 is contained in all of the tags 609B, 611B, 613B, 615B and 617B. In addition, the search term 601 is found in the title 617A.

At stage C, a search result display unit 619 refines the plurality of possible search results 607 based on the definition 603. The images 609, 611 and 615 are selected from the plurality of possible search results 607 because the definitions 609C, 611C and 615C match the definition 603 associated with the search term. The plurality of possible search results 607 are used for internal analysis by the search result display unit 619 and are not displayed to a user. In some embodiments, a resource can be associated with a definition automatically by the folksonomy tagging system if a search term is found in a resource's text, but no definition has been associated with a tag. The folksonomy tagging system may determine the definition by analyzing the resource text. For example, a definition may be chosen because the resource text contains both the search term and a synonym of the search term.

At stage D, the search result display unit 619 displays the search results 621 relevant to the search term 601 and its associated definition 603 to the user. The displayed search results 621 include images 609, 611 and 615.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIGS. 3 and 4, the operation for retrieving definitions may be combined with the operation to determine if more than one definition exists for a tag or search term.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in machine-readable signal media, examples of which include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
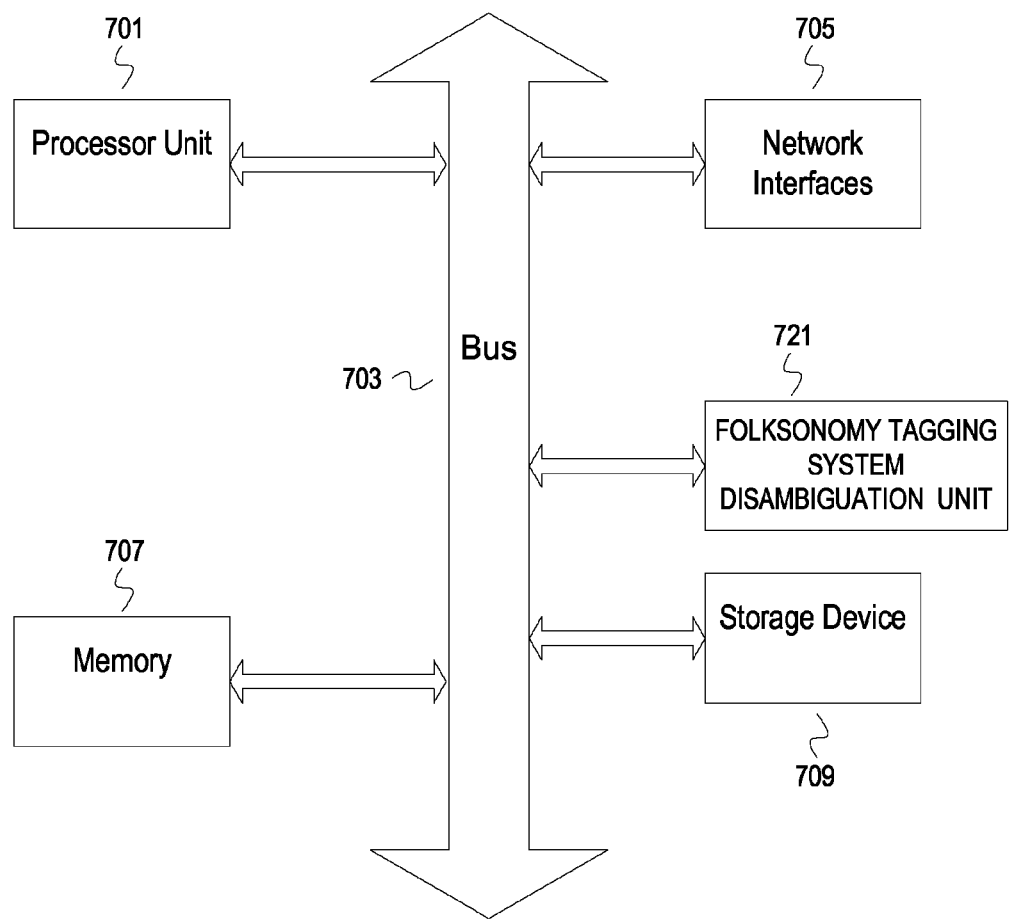
FIG. 7 depicts an example computer system.

FIG. 7 depicts an example computer system. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, InfiniBand®, NuBus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The computer system also includes a folksonomy tagging system disambiguation unit 721 that detects entry of ambiguous tags and associates definitions with the ambiguous tags. Any one of the functionalities described herein may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 603. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for disambiguating tags in a folksonomy tagging system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining that a first tag input into a network based multiple user tagging system for association with a resource is an ambiguous tag for the resource in the network based multiple user tagging system;
    analyzing a plurality of definitions for the ambiguous tag and at least one of the resource and a set of one or more tags already associated with the resource to determine if at least one of the plurality of definitions is appropriate for the resource;
    determining that at least a first of the plurality of definitions for the ambiguous tag is appropriate for the resource based, at least in part, on said analyzing the plurality definitions for the ambiguous tag and at least one of the resource and the set of one or more tags already associated with the resource; and
    associating, in the network based multiple user tagging system, the ambiguous tag with the first definition and with the resource.

2. The method of claim 1, wherein said determining that at least the first definition for the ambiguous tag is appropriate for the resource comprises at least one of:
    determining that the resource comprises one or more words that occur in the first definition, wherein the one or more words occur in at least one of text of the resource and metadata of the resource;
    determining that at least one of the set of one or more tags already associated with the resource occurs in the first definition;
    determining that a first of the set of one or more tags already associated with the resource is associated with the first definition;
    determining that a second resource, which is similar to the resource, is associated with the first definition; and
    receiving an indication of the first definition responsive to a prompt for an indication of at least one of the plurality of definitions.

3. The method of claim 1, wherein the resource comprises at least one of an electronic document, an image, multimedia content, text, an online application, and a hyperlink.

4. The method of claim 1 further comprising retrieving the plurality of definitions from one or more dictionaries from at least one of a local store and a remote store that hosts the one or more dictionaries.

5. The method of claim 1, wherein said determining that the first tag is the ambiguous tag comprises determining the plurality of definitions exist for the first tag.

6. The method of claim 1, wherein the plurality of definitions comprise at least one of a definition previously indicated by a user, a definition previously submitted for the resource or a similar resource, a definition associated with the set of tags previously submitted for the resource or a similar resource, and text of the resource.

7. The method of claim 1, wherein said associating the ambiguous tag with the first definition comprises appending metadata for the ambiguous tag, wherein the metadata comprises one of the first definition and a reference to the first definition.

8. The method of claim 1 further comprising:
associating the ambiguous tag with a second of the plurality of definitions; and
prioritizing the first definition and the second definition with respect to the ambiguous tag and the resource, wherein said determining that at least the first of the plurality of definitions for the ambiguous tag is appropriate for the resource comprises determining that the second definition for the ambiguous tag is also appropriate for the resource based, at least in part, on said analyzing the plurality definitions for the ambiguous tag and at least one of the resource and the set of one or more tags already associated with the resource.

9. One or more machine-readable storage media having stored therein a program product, which when executed by a set of one or more processor units causes the set of one or more processor units to perform operations that comprise:
determining that a first tag input into a network based multiple user tagging system for association with a resource is an ambiguous tag in the network based multiple user tagging system;
analyzing a plurality of definitions for the ambiguous tag and at least one of the resource and a set of one or more tags already associated with the resource to determine if at least one of the plurality of definitions as appropriate for the resource;
determining that at least a first of the plurality of definitions for the ambiguous tag is appropriate for the resource based, at least in part, on said analyzing the plurality definitions for the ambiguous tag and at least one of the resource and the set of one or more tags already associated with the resource; and
associating, in the network based multiple user tagging system, the ambiguous tag with the first definition and with the resource.

10. The machine-readable storage media of claim 9, wherein said operation of determining that at least the first of the plurality of definitions for the ambiguous tag is appropriate for the resources comprises at least one of:
determining that the resource comprises one or more words that occur in the first definition, wherein the one or more words occur in at least one of text of the resource and metadata of the resource;
determining that at least one of the set of one or more tags already associated with the resource occurs in the first definition;
determining that a first of the set of one or more tags already associated with the resource is associated with the first definition;
determining that a second resource, which is similar to the resource, is associated with the first definition; and
receiving an indication of the first definition responsive to a prompt for an indication of at least one of the plurality of definitions.

11. The machine-readable storage media of claim 9, wherein the resource comprises at least one of an electronic document, an image, multimedia content, text, an online application, and a hyperlink.

12. The machine-readable storage media of claim 9, wherein the operations further comprise retrieving the plurality of definitions for the ambiguous tag from one or more dictionaries hosted in at least one of a local store and a remote store.

13. The machine-readable storage media of claim 9, wherein said operation of determining that the first tag is the ambiguous tag comprises determining the plurality of definitions exist for the first tag.

14. The machine-readable storage media of claim 9, wherein the plurality of definitions comprises at least one of definitions previously indicated by a user, definitions previously submitted for the resource or a similar resource, definitions associated with tags previously submitted for the resource or a similar resource, and text of the resource.

15. The machine-readable storage media of claim 9, wherein said operation of associating the ambiguous tag with the first definition comprises appending metadata for the ambiguous tag, wherein the metadata comprises one of the first definition and a reference to the first definition.

16. The machine-readable storage media of claim 9, wherein the operations further comprise
associating the ambiguous tag with a second of the plurality of definitions; and
prioritizing the first definition and the second definition with respect to the ambiguous tag and the resource, wherein said determining that at least the first of the plurality of definitions for the ambiguous tag is appropriate for the resource comprises determining that the second definition for the ambiguous tag is also appropriate for the resource based, at least in part, on said analyzing the plurality definitions for the ambiguous tag and at least one of the resource and the set of one or more tags already associated with the resource.

17. An apparatus comprising:
a set of one or more processing units;
a network interface; and
a tagging system disambiguation unit operable to,
determine that first a tag input into a network based multiple user tagging system for association with a resource is an ambiguous tag for the resource in the network based multiple user tagging system;
analyze a plurality of definitions for the ambiguous tag and at least one of the resource and a set of one or more tags already associated with the resource to determine if at least one of the plurality of definitions is appropriate for the resource;
determine that at least a first of plurality of definitions for the ambiguous tag is appropriate for the resource based, at least in part, on said analysis of the plurality definitions for the ambiguous tag and at least one of the resource and the set of one or more tags already associated with the resource; and
associate, in the network based multiple user tagging system, the ambiguous tag with the first definition and with the resource.

18. The apparatus of claim 17, wherein the tagging system disambiguation unit being operable to determine that at least the first definition for the ambiguous tag is appropriate for the resource comprises the tagging system disambiguation unit being operable to at least one of:
determine that the resource comprises one or more words that occur in the first definition, wherein the one or more words occur in at least one of text of the resource and metadata of the resource;
determine that at least one of the set of one or more tags already associated with the resource occurs in the first definition;
determine that a first of the set of one or more tags already associated with the resource is associated with the first definition;
determine that a second resource, which is similar to the resource, is associated with the first definition; and
receive an indication of the first definition responsive to a prompt for an indication of at least one of the plurality of definitions.

19. The apparatus of claim 17 further comprising a machine-readable storage medium that embodies the tagging system disambiguation unit.

* * * * *